United States Patent
Simmons et al.

(10) Patent No.: US 7,426,234 B2
(45) Date of Patent: Sep. 16, 2008

(54) SYNCHRONIZATION SIGNAL DETECTOR AND METHOD

(75) Inventors: Sean B. Simmons, Waterloo (CA); Zoltan Kemenczy, Mississauga (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/499,292

(22) Filed: Aug. 4, 2006

(65) Prior Publication Data

US 2006/0269019 A1 Nov. 30, 2006

Related U.S. Application Data

(63) Continuation of application No. 09/996,119, filed on Nov. 28, 2001, now Pat. No. 7,099,421.

(60) Provisional application No. 60/253,571, filed on Nov. 28, 2000.

(51) Int. Cl.
*H04B 1/00* (2006.01)
(52) U.S. Cl. .................. 375/150; 375/152; 375/354
(58) Field of Classification Search .............. 375/354, 375/355, 357, 365, 367, 371, 373, 150, 152
See application file for complete search history.

(56) References Cited

U.S. PATENT DOCUMENTS

| | | | |
|---|---|---|---|
| 3,654,390 A | 4/1972 | Puckette | |
| 3,766,316 A | 10/1973 | Hoffman et al | |
| 4,203,002 A | 5/1980 | Nossen | |
| 4,414,676 A | 11/1983 | Kraul et al. | |
| 5,117,441 A | 5/1992 | Weigand | |
| 5,276,706 A | 1/1994 | Critchlow | |
| 5,574,754 A | 11/1996 | Kurihara et al. | |
| 5,617,451 A | 4/1997 | Mimura et al. | |
| 5,754,603 A | 5/1998 | Thomas et al. | |
| 5,856,997 A | 1/1999 | Mochizuki et al. | |
| 5,917,850 A | 6/1999 | Fujita et al. | |
| 6,014,416 A | 1/2000 | Shin et al. | |
| 6,175,391 B1 | 1/2001 | Kwak | |
| 6,546,055 B1 | 4/2003 | Schmidl et al. | |
| 6,785,350 B1 | 8/2004 | Poulbere et al. | |
| 6,925,108 B1 * | 8/2005 | Miller et al. | ................ 375/150 |
| 2002/0067784 A1 | 6/2002 | Bowler | |

* cited by examiner

*Primary Examiner*—Chieh M. Fan
*Assistant Examiner*—Jason M. Perilla
(74) *Attorney, Agent, or Firm*—Jones Day; Krishna K. Pathiyal; Robert C. Liang

(57) ABSTRACT

A synchronization (sync) signal detector and associated method detect the occurrence of a known sync signal in a received signal. The known sync signal is generated and correlated with the received signal to generate a correlation waveform. A peak value of the correlation waveform, indicative of the occurrence of the sync signal in the received signal, is detected and used to determine a timing offset between the received signal and the sync signal. The sync signal is then shifted in time to compensate for the timing offset. Such shifting of the sync signal is simpler and requires substantially less processing time and resources compared to known sync signal detection schemes, in which a received signal or the sampling timing of a received signal is shifted to compensate for timing offset.

14 Claims, 13 Drawing Sheets

US 7,426,234 B2

SYNCHRONIZATION SIGNAL DETECTOR AND METHOD

CROSS-REFERENCE TO RELATED APPLICATION

This application is a continuation of U.S. application Ser. No. 09/996,119 filed Nov. 28, 2001, now U.S. Pat. No. 7,099,421, which in turn claimed priority to U.S. Provisional Application Ser. No. 60/253,571, filed on Nov. 28, 2000. The complete disclosures of these applications, including the drawings, are hereby incorporated into this application by reference.

FIELD OF THE INVENTION

This invention relates to a receiver detecting a synchronization (sync) signal or pattern sent by a transmitter to the receiver.

BACKGROUND OF THE INVENTION

In some communication systems, a data pattern or portion of a received signal (i.e. a synchronization signal) is used to control decoding or other processing of the remainder of the received signal. In such systems, successful decoding or processing of a received signal is dependent upon accurate reception of the synchronization signal. The present invention addresses this need.

SUMMARY

According to an aspect of the invention, a sync signal detector comprises a sync signal generator for generating a reference sync signal, a sampler connected to the sync signal generator, a waveform correlator connected to the sampler, the waveform correlator receiving a input signal, and a peak detector connected to the waveform correlator and the sampler.

In a related embodiment of the invention, a process for detecting a sync signal within an input signal comprises the steps of: a) generating a version of the sync signal, b) correlating the sync signal with the input signal to generate a correlation signal, c) detecting a correlation peak in the correlation signal, d) estimating a timing offset based on the correlation peak for use by step a), e) repeating step a) to generate a shifted version of the sync signal using the timing offset estimated in step d), and f) further processing the input signal based on the shifted version of the sync signal until the end of the input signal.

A sync signal detector according to a further aspect of the invention comprises means for generating an internal sync signal, means for sampling said internal sync signal, the means for sampling operatively connected to the means for generating, means for correlating a waveform, the means for correlating operatively connected to the means for sampling, the means for correlating receiving a input signal, and means for detecting a peak, the means for detecting a peak operatively connected to the means for correlating and the means for sampling.

In accordance with another aspect of the invention, a method for detecting a data pattern in an input signal comprises the steps of matching the data pattern to a known sync pattern using waveform correlation, shifting the known sync pattern by a timing offset determined from the waveform correlation to create a shifted sync pattern, and utilizing the shifted sync pattern to further process the input signal.

A still further embodiment of the invention comprises a computer readable medium containing instructions for implementing a method for detecting a data pattern in an input signal, the method comprising the steps of matching the data pattern to a known sync pattern using waveform correlation, shifting the known sync pattern by a timing offset determined from the waveform correlation to create a shifted sync pattern; and utilizing the shifted sync pattern to further process the input signal.

According to an additional aspect of the invention, a wireless communication device comprises a transceiver configured to transmit and receive communication signals, and a digital signal processor (DSP) operatively coupled to the transceiver, the DSP comprising computer software code for detecting a data pattern in a communication signal, by performing the functions of matching the data pattern to a known sync pattern using waveform correlation, shifting the known sync pattern by a timing offset determined from the waveform correlation to create a shifted sync pattern, and utilizing the shifted sync pattern to further process the communication signal.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION

In communications networks, such as a radio frequency (RF) communication network, reception quality is improved if a receiver is able to synchronize with a transmitter. This synchronization aids the receiver in accurately receiving and processing the information provided by the transmitter.

Figure 1:
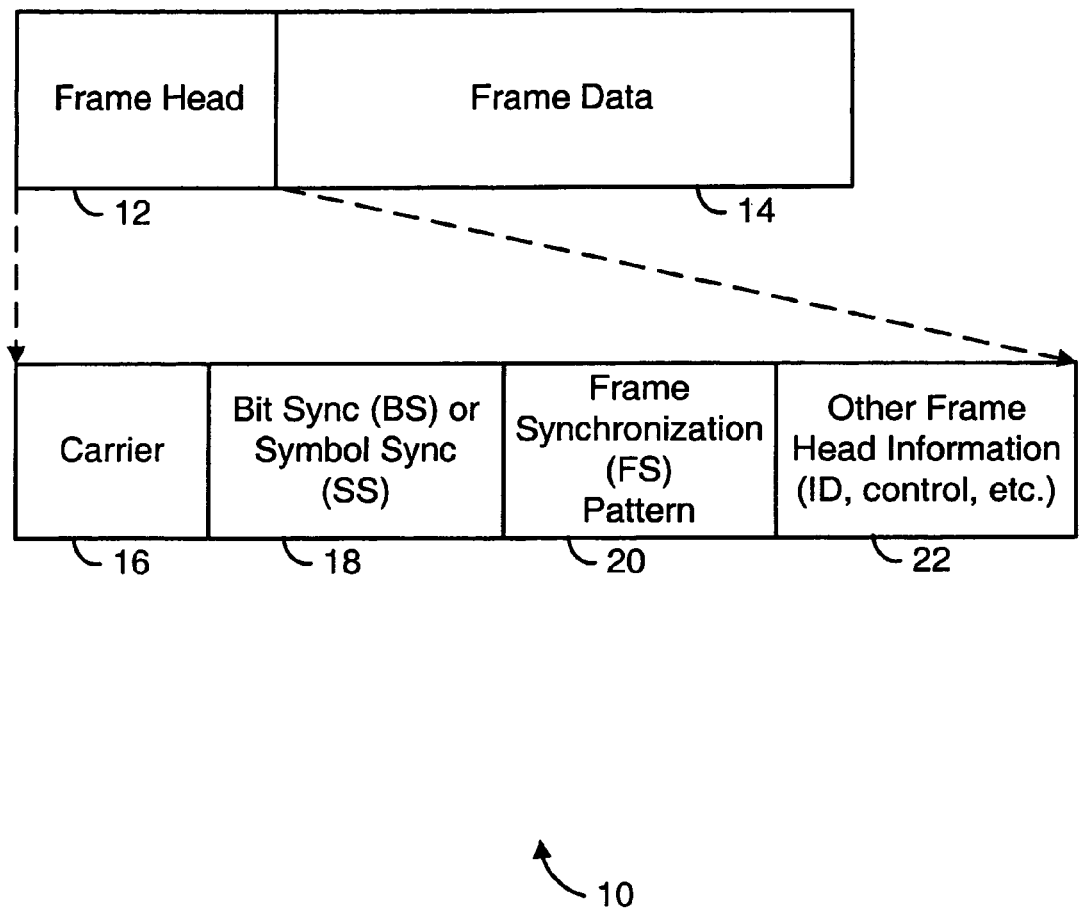
FIG. 1 is a block diagram of a frame.

Some known communication networks make use of packet based communications. In such networks, a transmitter sends a stream of packets that contain information to one or more receivers. Packets are often grouped together to form frames. Referring now to FIG. 1, a block diagram of such a frame is shown generally as 10. As one skilled the art will appreciate, the structure of a frame may vary considerably and that frame 10 is only one example of a frame structure.

As illustrated in FIG. 1, frame 10 comprises a frame head 12 and frame data 14. Frame head 12 contains information that provides a description of the contents of frame 10. Frame data 14 contains the packets.

Frame head 12 comprises: carrier portion 16, bit or symbol synchronization pattern 18 (BS or SS), frame synchronization (FS) pattern 20, and other frame head information 22. The Mobitex™ wireless communication system uses frames of a general structure similar to frame 10.

In the example frame head 12, the carrier portion 16 is an unmodulated signal representative of the carrier used in the communication system over which frames such as 10 are transmitted and received, and allows a receiver to determine carrier frequency. Bit sync pattern 18 is normally a known alternating pattern that allows a receiver to determine bit or symbol timing. Frame sync pattern 20 is a pattern different from bit sync pattern 18. Frame sync pattern 20 provides a different known data or bit pattern that will ideally only appear in a data stream or transmitted signal when a frame sync pattern 20 is actually being transmitted. Frame sync pattern 20 provides synchronization information to a receiver. Other frame head information 22 includes identification (ID) and control information, which may for example designate a particular decoding process to be used in a receiver. Thus, frame head 12 contains information required for successful reception of a transmitted frame by a receiver.

Figure 2:
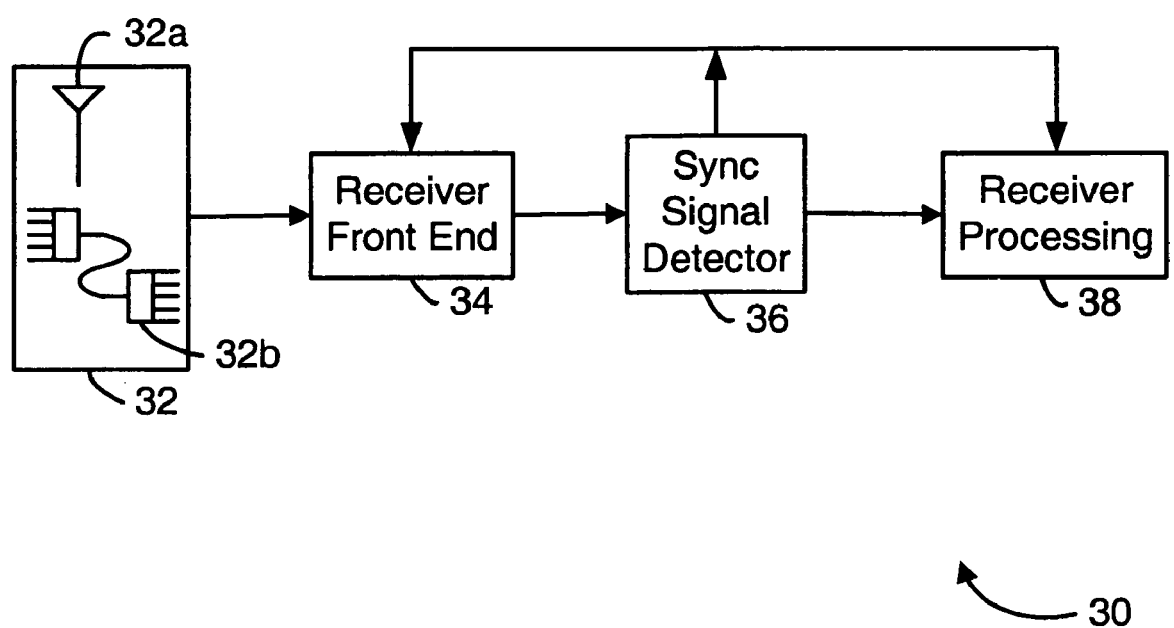
FIG. 2 is a block diagram of a first communication signal receiver.

Referring now FIG. 2, a block diagram of a first communication signal receiver is shown generally as 30. Receiver 30 comprises a receiver element 32, a receiver front end 34, a sync detector 36 and a receiver processing module 38. A signal received at receiver element 32, which may for example be an antenna 32a or wired connection 32b, is processed by receiver front end 34, which may include such functions as amplification, filtering and analog to digital conversion. Sync detector 36 operates to detect synchronization signals such as the bit sync pattern 18 and frame sync pattern 20 in a received signal, as discussed further below, and may provide sync and control signals to receiver front end 34 and receiver processing module 38. Module 38 may for example include symbol detection, deinterleaving, decoding, error detection, error correction and other such signal processing functions. In many modern receivers, sync detector 36 and receiver processing module 38 would be implemented as a digital signal processor (DSP).

In known receivers such as the example receiver 30, the sync and control signals output from sync detector 36 would be used in other receiver components or modules to realign or shift a received signal to compensate for timing offset. As will be apparent to those skilled in the art, timing offset is the offset between actual sample timing and ideal sample timing, the ideal timing normally corresponding to sampling at the centre of a bit or symbol period. According to known techniques, when a sync signal or pattern is detected in a portion of a received signal, appropriate sync and control signals are output to other receiver components to effectively realign the received signal and the receiver sample timing such that the actual sample timing approaches the ideal timing.

In conventional signal receivers, particularly in digital receivers operating on digitized versions of received signals, the received signal is stored and can be "replayed" and re-sampled to correct for timing offset. However, such re-sampling of the received signal tends to involve substantial processing, as the entire received signal must be replayed and re-sampled. In addition, it would be desirable to determine the modulation index, a measure of signal gain, and frequency offset of the received signal from a detected sync signal. Since a received sync signal should exhibit a known pattern, the modulation index and frequency offset can be accurately determined by a sync signal detector, provided that the sample timing of the received signal and the receiver are the same. To determine the modulation index and frequency offset would also require re-sampling of the received signal in prior art systems and is therefore similarly processing intensive.

Therefore, there remains a need for a less intensive sync signal detection system and method that involves fewer signal processing functions and thereby reduces the complexity of the sync signal detector and the time associated with sync signal detection operations. The present invention meets this need by using a waveform correlation for sync signal detection and shifts a reference sync signal instead of the received signal to compensate for any timing offset.

As discussed above, the bit sync pattern 18 and frame sync pattern 20 are known patterns which occur at known positions in a received frame 10 and can therefore be used to synchronize a receiver 30.

Figure 3:
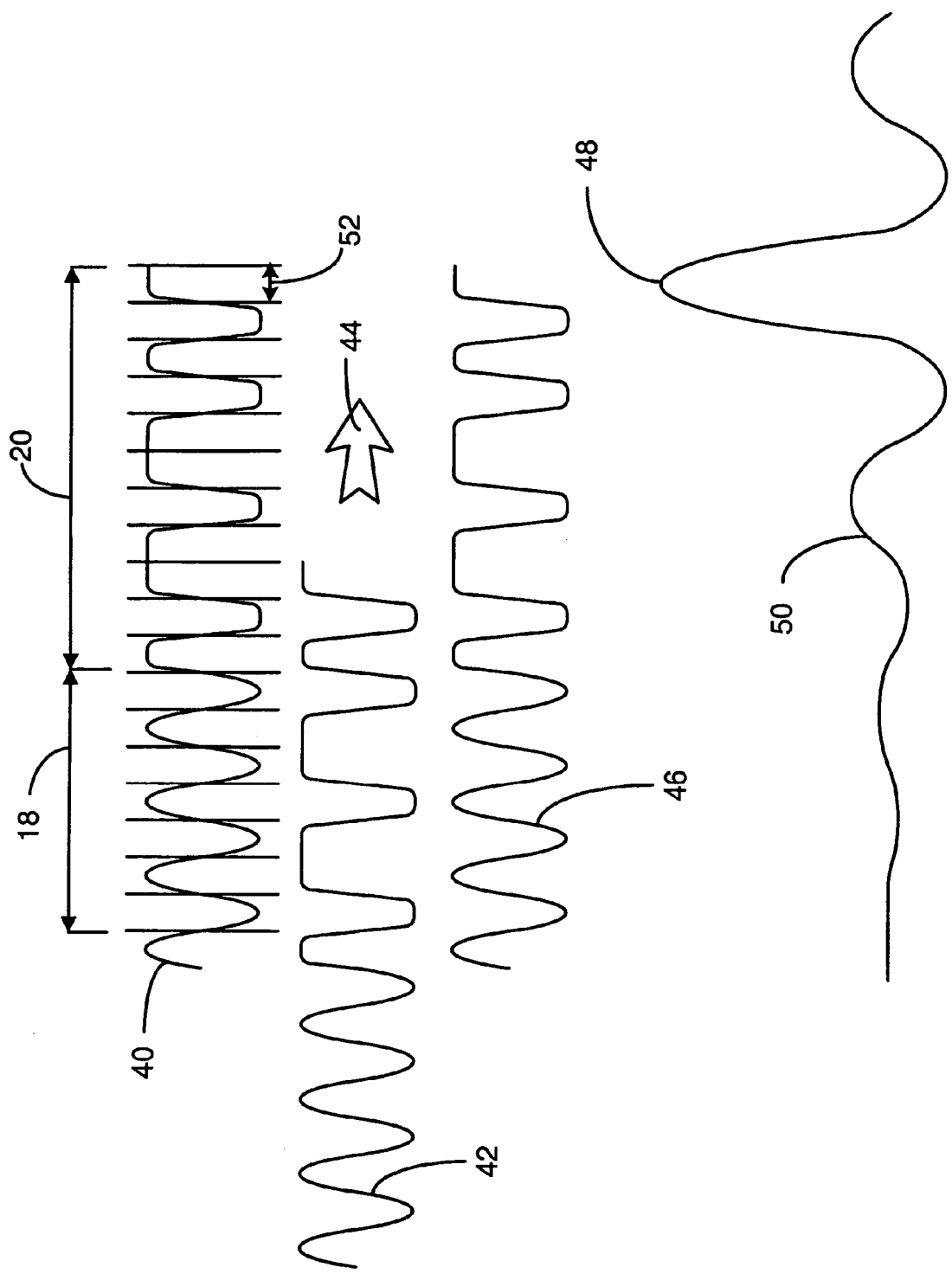
FIG. 3 is a signal diagram illustrating waveform correlation.

FIG. 3 is a signal diagram illustrating waveform correlation. In FIG. 3, an example portion of a received frame head is shown as signal 40. Signal 40 comprises bit sync pattern 18 and frame sync pattern 20. Carrier portion 16 and other frame head information 22 are neither directly involved in nor affected by the invention and therefore are not shown. The period of signal 40 is shown by feature 52, which for the purpose of this example is a one bit or symbol period. The particular patterns shown in FIG. 3 are illustrative examples only. As one skilled in the art will recognize the invention is in no way restricted to the example signal shown.

A signal receiver 30 which receives a frame such as frame 10 would normally initially detect carrier portion 16 and then establish bit or symbol timing based on bit sync pattern 18 to enable receiver 30 to detect bits or symbols. Having established bit or symbol timing, receiver 30 then begins detecting bits or symbols to search for frame sync pattern 20 on a bit-by-bit (bit correlation) or symbol-by-symbol (symbol correlation) basis. When the frame sync pattern 20 is detected, receiver 30 can determine timing offset, adjust sampling the incoming received signal accordingly and proceed with further processing of the received signal. In most conventional receivers, the frame sync pattern 20 is detected in a portion of the received signal when the number of bits or symbols that differ from frame sync pattern 20 is below a predetermined threshold, normally one or more bits or symbols.

Known synchronization processes operate effectively under good signal conditions and may be sufficient for some applications. However, in many communication environments, signal quality can potentially vary below levels required for reliable sync signal detection. For example, at low signal to noise ratios (SNRs), the duration of the carrier portion 16 and the bit sync pattern 18 tends to be too short to allow for accurate bit or symbol timing determination, such that the frame sync pattern 20 cannot be detected and the received signal cannot be properly processed.

Synchronization signal detection can be improved by using waveform correlation techniques as illustrated in FIG. 3. Waveform correlation exploits the fact that both the relative location and the shape of sync signals will necessarily be known to a receiver 30. Instead of searching for sync signals on a bit-by-bit or symbol-by-symbol basis, a waveform correlator compares the entire known pattern or signal shape to a received signal and generates a corresponding metric indicating the similarity of the received signal to the known signal.

Waveform correlation essentially involves "sliding window" type processing. Portions of the received signal, one of which is shown as window portion 40, corresponding in length to the known sync signal 42, are compared to the known sync signal 42 in an attempt to achieve a matching signal 46. The sliding function is indicated by the arrow 44. The resulting calculated correlation or metric values should be relatively low for all window positions in the received signal except for the matching signal 46. The position of the peak 48 of correlation waveform 50 indicates the presence of the sync signal 42. Although the example in FIG. 3 illustrates correlation of the bit sync pattern 18 and the frame sync pattern 20 to the received signal, other signal correlations, for example the correlation of either of the bit sync pattern 18 or the frame sync pattern 20 to the received signal, may also or instead be performed.

Conceptually, the sync signal detection process is straightforward. Correlation peak 48 tends to be pronounced and should thus be relatively easily detected. However, in digital receiver arrangements, waveform correlation operations are performed on signal samples. Although detection of the highest correlation waveform sample remains simple, unless a sampling instant occurs at the peak 48 of the waveform 50, then the peak sample is not the true peak of the correlation waveform and therefore does not accurately indicate the position of the sync signal 42. As discussed further below, the amplitude of the peak sample may also be inaccurate.

Figure 4:
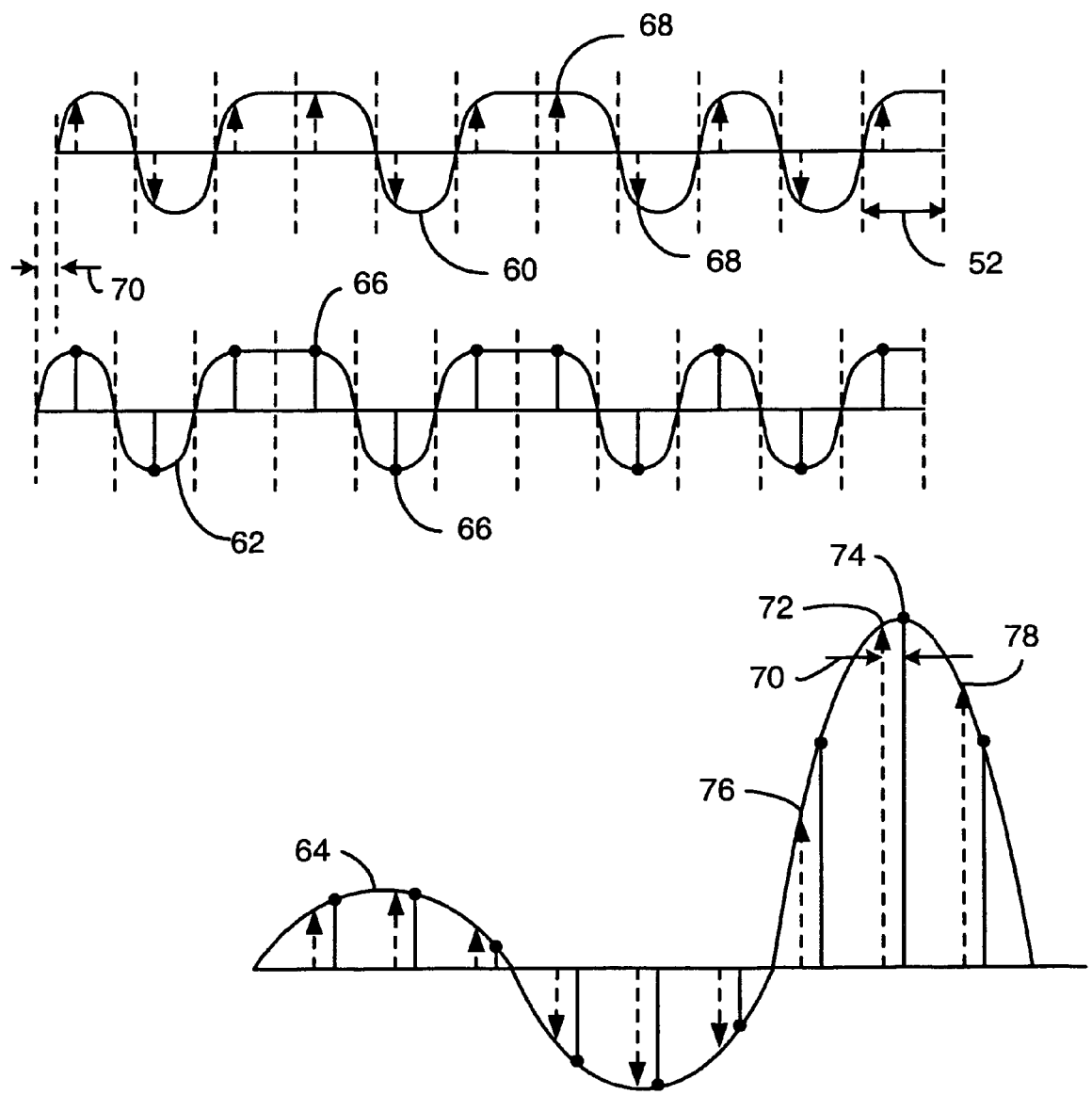
FIG. 4 is a signal diagram illustrating timing offset and waveform correlation.

FIG. 4 is a signal diagram illustrating timing offset and waveform correlation. FIG. 4 provides an example of the digital peak detection problem and its cause in digital receivers. In FIG. 4, signal 60 represents a portion of a received signal. Signal 62 is a portion of the known sync signal 42 to be detected. Signal 64 represents a portion of the correlation waveform 50 comprised of correlation values or metrics generated by a waveform correlator. Bit or symbol periods are denoted by the vertical dashed lines having a period illustrated by feature 52 as in FIG. 3. For the purpose of clarity, only a portion of the received signal, the known sync signal and the correlation waveform are shown in FIG. 4. It will be apparent to those skilled in the art that the received signal samples would correspond to sampling at a sampling rate of at least twice the bit or symbol rate of the received signal. However, FIG. 4 and subsequent Figures show only a single sample per bit or symbol period 52 in order to avoid congestion in the drawings.

Ideally, the received signal will be sampled at the centres of the bit or symbol periods 52. In practical systems however, there is often a timing offset between actual sampling instants and the bit or symbol period centres. The known sync signal 42 would be generated in a receiver and therefore its sampling can be controlled. According to known techniques, the locally generated sync signal samples 66 are representative of mid-period sampling. Although the received signal samples 68 are offset from the sync signal samples 66 by timing offset 70, the correlation waveform 64 will exhibit a relative peak when the known sync signal 62 has been aligned with window portion 60. The pattern of a sync signal 42, of which only a portion 62 is shown in FIG. 4, is normally chosen to ensure that no other expected signal patterns will approximate the pattern of sync signal 42 closely enough to incorrectly indicate the presence of sync signal 42. Therefore, alignment of a known sync signal 42 with a portion of a received signal which contains the sync signal should always result in a correlation peak.

Detection of the peak sample 72 in the correlation waveform 64 is relatively straightforward. In the presence of timing offset 70, however, peak sample 72 does not correspond to the true correlation peak 74. Any estimate of sync signal position or amplitude based on peak sample 72 may therefore be in error. Samples before and after peak sample 72 are shown as features 76 and 78 respectively. Although not shown in FIG. 4, at a sampling rate of twice the bit or symbol rate, peak sample 72 may be offset from true correlation peak 74 by up to one-quarter of a bit or symbol. Ideally, the value of timing offset 70 should be zero, although in practical systems, offsets of up to about one-sixteenth of a bit or symbol are typically acceptable.

Figure 5:
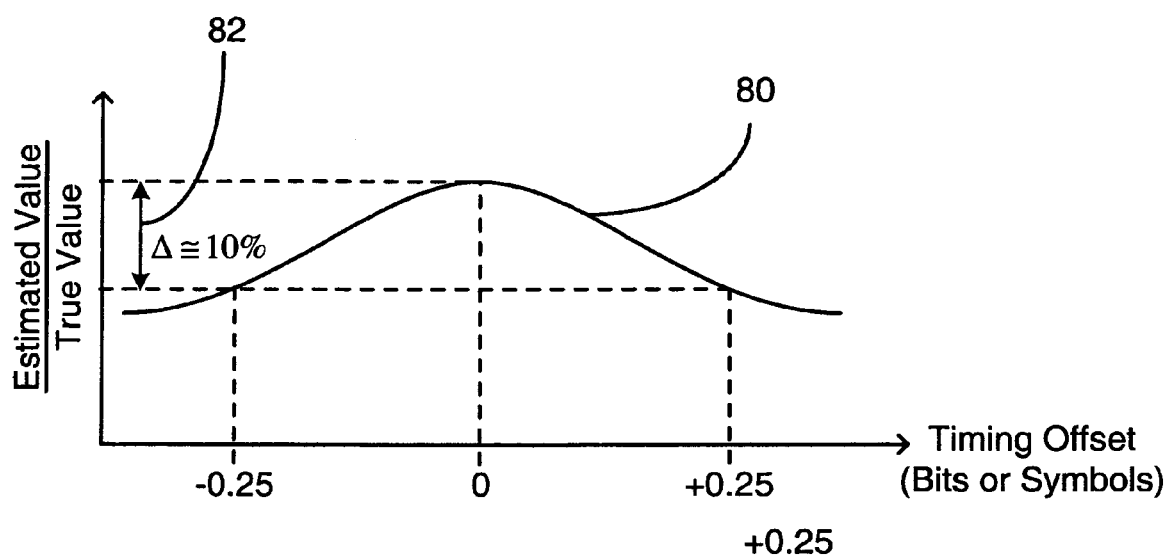
FIG. 5 is a graph indicating the effect of timing offset.

FIG. 5 is a graph indicating the effect of timing offset. As shown in the FIG. 5, estimated values along curve 80, which would be sample values in digital receivers, can vary with timing offset. These values may for example be such signal characteristics as timing offset, frequency offset or modulation index. Within the above example range of ±0.25 bits or symbols, estimates may vary up to a delta of 10% (feature 82), which will be unacceptable in many applications, particularly those in which soft signal receiver processing is required or desired.

Using a correlation waveform such as 64, timing offset can be estimated by using curve fitting techniques. In accordance with such techniques (e.g. least squares), a true correlation waveform peak, shown at 74 in FIG. 4, is approximated by a parabola which is a best-fit to the peak sample 72 and two adjacent samples 76 and 78 (FIG. 4). The position of the true correlation peak 74 can then be estimated and compared with the peak sample 72 to determine an estimate of the timing offset 70.

The timing offset estimate may then be fed back to the receiver front end 34, fed forward to the receiver processing module 38 or both, dependent upon the particular receiver architecture and synchronization arrangement of receiver 30 (FIG. 2). In known receivers, the timing offset estimate is used to determine a time shift required to compensate the received signal for the timing offset. The time shift may be applied to a received signal in digital receivers by "replaying" the received signal from memory with a delay or advance corresponding to the timing offset estimate and re-sampling the replayed signal. In many receivers the replaying and re-sampling functions would be performed by calculating new signal samples based on stored samples of a received signal.

Figure 6:
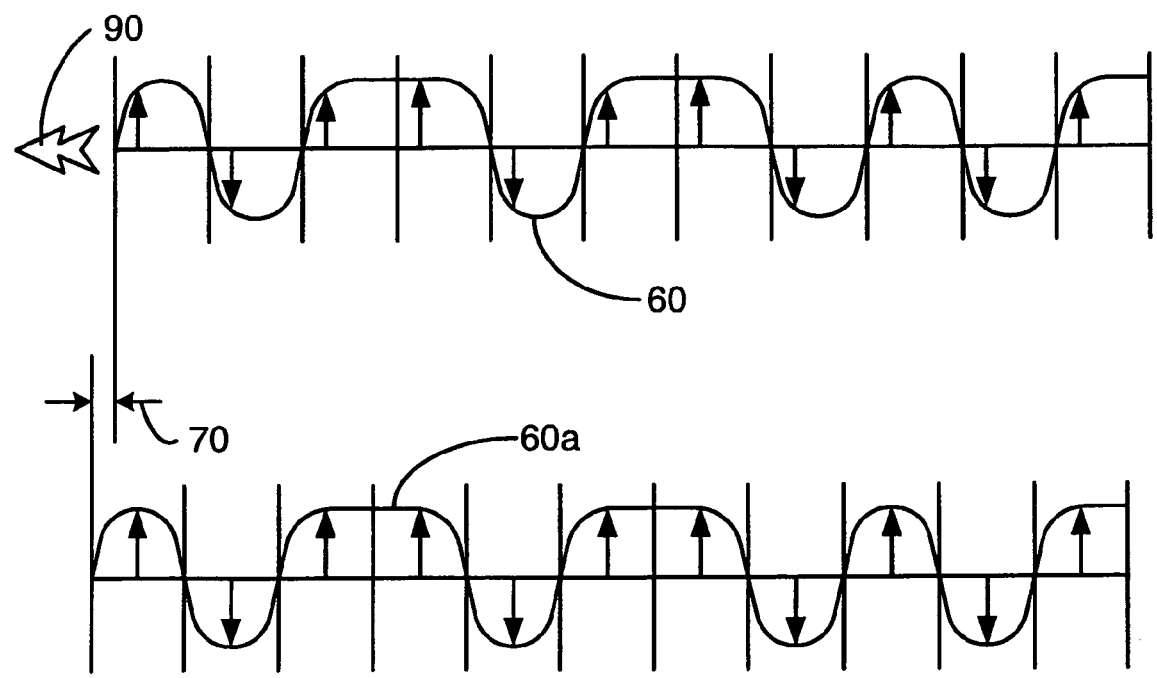
FIG. 6 is a graphical representation of a time shift of a received signal.

FIG. 6 is a graphical representation of a time shift of a received signal. A time shift 90 (based upon an estimate of timing offset 70) might be applied to a portion of a received signal 60 by replaying signal 60 to create new shifted signal 60a. Shifted signal 60a may then be re-sampled at the sampling instants, as shown. Other techniques for applying a time shift 90 to a portion of a received signal 60 will also be apparent to those skilled in the art, such as replaying the signal 60 from memory and adjusting sampling instants to compensate for estimated timing offset 70. Such techniques have been used in conjunction with known sync detectors to shift signal 60 to compensate for timing offset 70.

Figure 7:
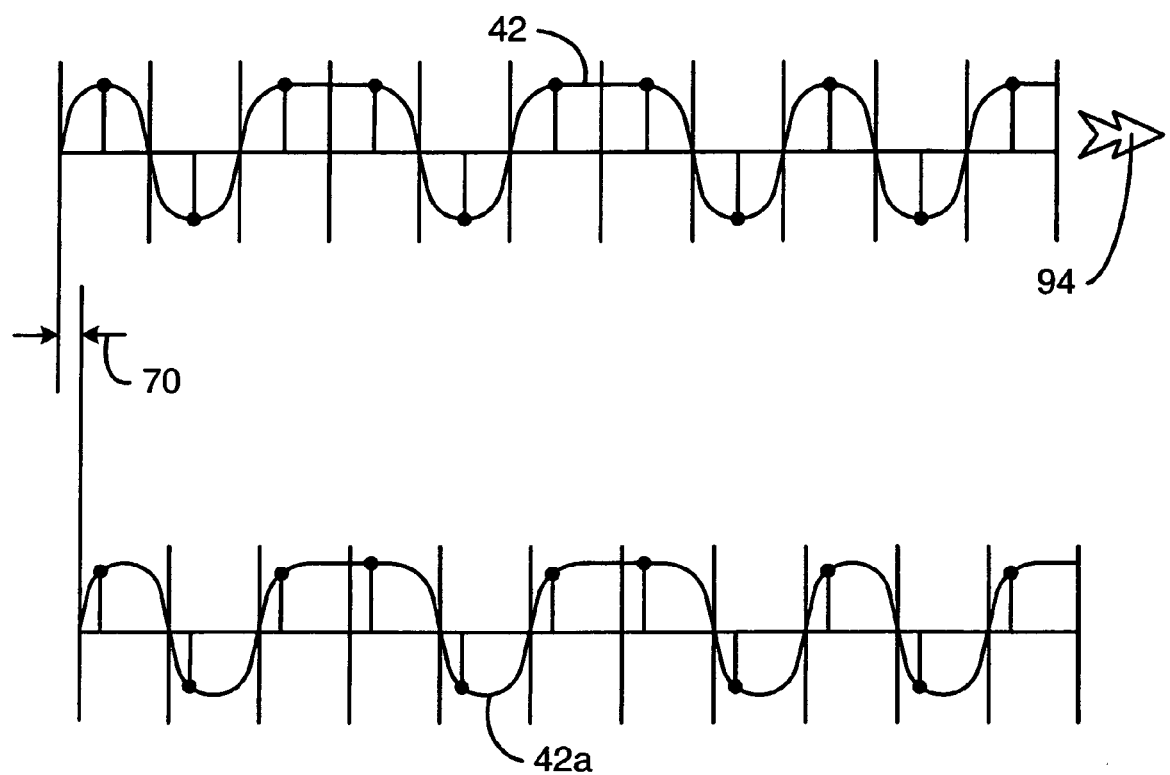
FIG. 7 is a graphical representation of a time shift of a sync signal.

FIG. 7 is a graphical representation of a time shift of a sync signal. Rather than applying a time shift (based upon an estimate of timing offset 70) to a portion of a received signal 60, the present invention applies a time shift 94 to sync signal 42 to create new sync signal 42a. Instead of correcting for timing offset 70, which is essentially an error in the incoming signal, the present invention processes a locally generated reference sync signal 42 to effectively introduce a corresponding amount of error, contrary to the teachings of all known prior art. This results in the creation of a new reference sync signal 42a. As shown in FIG. 7, the sync signal sampling is effectively time shifted by an amount corresponding to the estimated timing offset 70. Such time shifting of the sync signal sampling may be achieved by shifting either the locally generated reference sync signal 42 or the sample timing.

The time shifting of the locally generated reference sync signal 42 or its sample timing to create reference sync signal 42a improves the operation of a sync signal detector, since sample timing in a time shifted reference sync signal 42a is the same as or very close to sample timing in a received signal. Therefore, both the amplitude and location of samples in the reference sync signal accurately indicate the amplitude and position of the samples of a portion of the received signal that includes the sync signal. This improves both sync signal detection reliability and noise immunity and also provides for more accurate estimation of modulation index and frequency offset, as described in further detail below.

A further advantage of time shifting a reference sync signal 42 instead of the received signal is that the known sync signal 42 is generated at the receiver. As such, a sync signal detector 36 (FIG. 2) has full control of sync signal generation and sampling. Shifting of either the locally generated sync signal 42 or a timing signal controlling the sampling thereof is a more simply and easily implemented than the known received signal shifting techniques. In addition, sync signal 42 is typically much shorter than the entire received signal and therefore requires less processing to re-sample.

Figure 8:
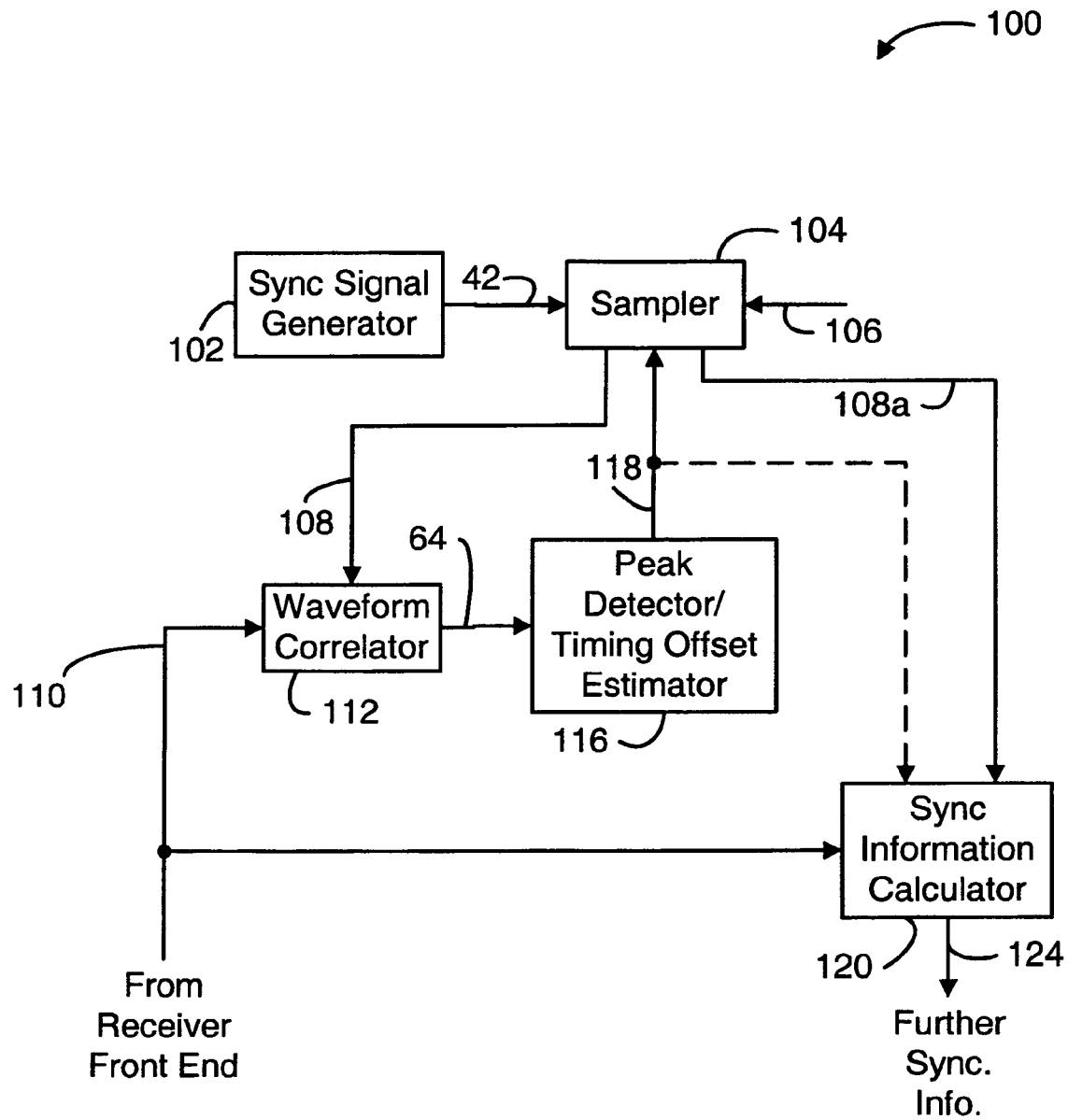
FIG. 8 is a block diagram of a sync signal detector in accordance with a first embodiment of the present invention.

Referring now to FIG. 8, a block diagram of a sync signal detector in accordance with a first embodiment of the present invention is shown generally as 100. Detector 100 may be viewed as providing the functionality of block 36 of FIG. 2. A sync signal generator 102 outputs the known sync signal 42 to be detected by detector 100 to a sampler 104. Sampler 104 may for example be a sample and hold circuit, analog to digital converter (ADC) or the like. Sampler 104 samples or digitizes sync signal 42 in accordance with a sampling signal 106, which in most embodiments would be generated by a local oscillator or frequency synthesizer in a receiver, and outputs digitized reference sync signal 108. An input signal 110 from the receiver front end 34 is correlated with reference sync signal 108 by waveform correlator 112. A correlation waveform 64 generated by correlator 112 is output to a peak detector and timing offset estimator 116. Estimator 116 operates as discussed herein above to estimate timing offset. Estimator 116 outputs a control signal 118 to either the sampler 104 as shown, or alternatively to the sync signal generator 102, to effectively time shift the sampling instants or generated sync signal 42 according to the estimated timing offset. In digital receivers, the sync signal generator 102 and sampler 104 may be implemented as a single functional block in a DSP, such that digital sync signal sample values are calculated in accordance with the sampling signal 106 and control signal 118, without generating an analog sync signal 42. In the detector 100, the algorithm utilized by sync information calculator 120 may also be adjusted in response to timing offset estimates from estimator 116.

The time shifted version 108a of the reference sync signal is then input to the sync information calculator 120. The calculator 120 uses the shifted reference sync signal 108a and the received signal 110 to calculate further sync information such as modulation index and frequency offset, and may also make a final determination of whether or not a sync signal detected in a received signal is actually a valid sync signal. Calculator 120 may also receive the outputs from estimator 116 for calculation of the further sync information. The sync information determined by calculator 120 is preferably provided to other components (not shown) of a receiver in which the detector 100 is implemented, as signal 124.

Figure 9:
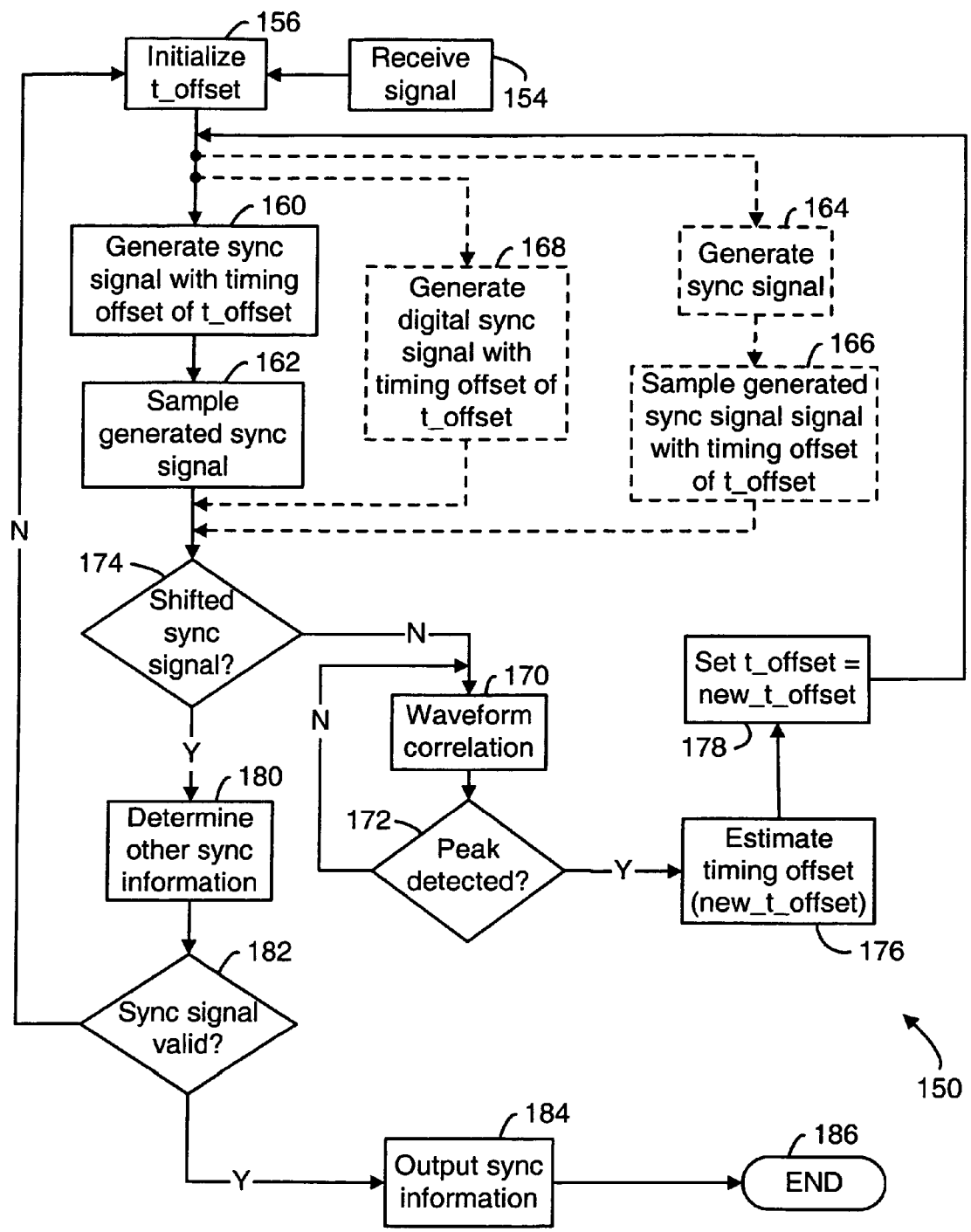
FIG. 9 is a logical flow diagram of the process of the sync signal detector of FIG. 8.

Referring now to FIG. 9, a logical flow diagram of the process of the sync signal detector of FIG. 8 is shown generally as 150. Process 150 begins at step 154 when a signal 110 is received. Moving next to step 156 a timing offset value t_offset is initialized, preferably to zero. Although an initial timing offset of zero is preferred, other initial offsets, such as a previous timing offset estimate, may also be used. A digital version of the known sync signal 42 is then generated. In the example frame shown in FIG. 1, sync signal 42 preferably includes the bit sync pattern 18, the frame sync pattern 20, or both.

Sync signal 42 may be generated by first generating an analog version of the sync signal with the timing offset of t_offset and sampling the generated signal, as indicated at steps 160 and 162. Alternatively, an analog version of the known sync signal 42 may first be generated at a step 164 and sampled as at step 166, with the sample timing at step 166 being shifted relative to ideal mid-period sampling by a timing offset of t_offset. In digital implementations, a digital version of the known sync signal 42 corresponding to sampling with a timing offset of t_offset could be calculated directly or generated from stored samples for example, at a step 168. A particular implementation of the present invention would preferably use only one of these sync signal generation techniques.

Before sync signal 42 has been detected in a received signal 110, the timing offset used for generation of sync signal is the initial value of t_offset set at step 156. Those skilled in the art will appreciate that since the sync signal is a known signal, the sync signal generation steps shown in FIG. 9 may be performed in parallel with receiver front-end processing which produces signal 110. Other relative timings of these operations are within the scope of the invention.

At step 174, it is then determined whether or not the generated reference sync signal was generated using the initial offset established at step 156 or is a shifted sync signal generated using an offset estimated following a correlation operation. The determination at step 174 may be accomplished with a repeat count index, initialized at the beginning of the sync signal detection operations and incremented after correlation waveform peak detection and timing offset estimation. Such repeat count index initialization and increment steps will be apparent to those skilled in the art, but have not been shown in FIG. 9 in order to avoid congestion in the diagram. Other techniques may also be used to determine if the generated sync signal is an initial sync signal or a post-correlation shifted sync signal.

If a correlation has not yet been performed, then waveform correlation as described above is performed at step 170, and continues until a correlation peak is detected. When a peak is detected at step 172, a new timing offset new_t_offset is estimated at step 176 and the timing offset value t_offset is updated with the new timing offset estimate new_t_offset at step 178. For example, new_t_offset may be calculated as follows:

$$\text{new\_t\_offset} = \frac{C_0 - C_2}{2*(C_0 - 2*C_1 - C_2)}$$

where $C_0$, $C_1$ and $C_2$ respectively correspond to correlation signal samples 76, 72, and 78 (see FIG. 4), that are output by the correlation block 170 in FIG. 9.

Process 150 then returns to step 160, 164, or 168, depending upon how the known sync signal 42 is generated. The sync signal 42, time-shifted in accordance with the updated timing offset is then generated and a positive determination will be made at step 174. The shifted sync signal is then processed at step 180 to determine other synchronization information or parameters, such as modulation index and frequency offset for example. As described above, calculated sync information or possibly other signal parameters may be used to determine whether or not a sync signal detected in a received signal is valid, as shown at step 182. If the detected sync signal is determined to be valid, then any calculated sync information, and possibly the shifted sync signal, is output to further components of a receiver at step 184, and the sync signal detection process 150 ends at step 186. If the sync signal is not determined to be valid, resulting in a negative determination at step 182, then control returns to step 156, where timing offset is re-initialized at step 156 and process 150 is repeated using a subsequent portion of the received signal.

Those skilled in the art will appreciate that although the sync signal detection process 150 ends after a sync signal is determined to be valid, processing of a received signal by other receiver components based on a detected valid sync signal may continue thereafter. The sync signal detection process 150 would then be repeated when a portion of a received signal, such as a complete frame for example, has been processed and a new sync signal must be detected.

Figure 10:
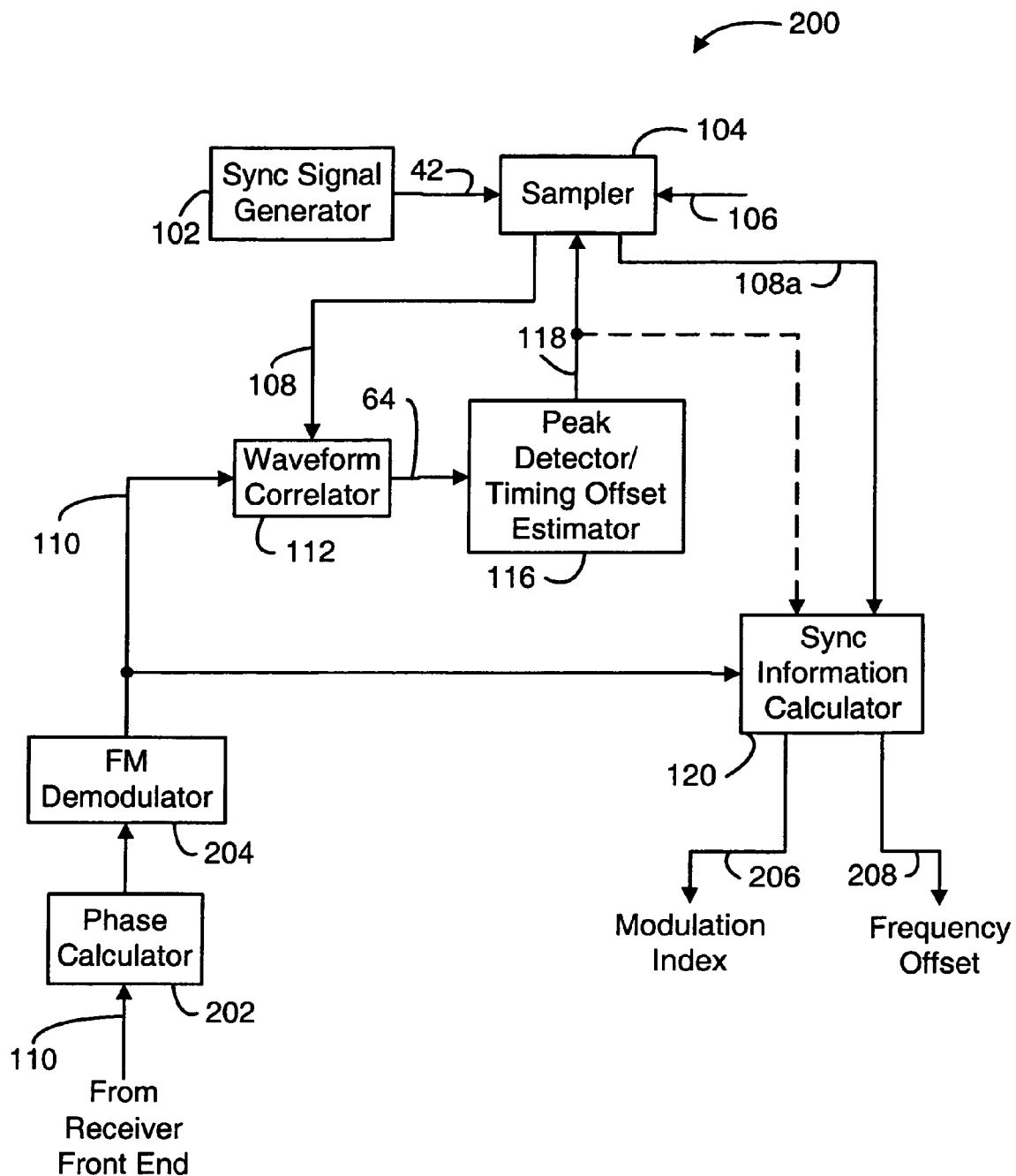
FIG. 10 is a block diagram of a sync signal detector in accordance with a second embodiment of the present invention.

Referring now to FIG. 10, a block diagram of a sync signal detector in accordance with a second embodiment of the present invention is shown generally as 200. Sync signal detector 200 includes a phase calculator 202 and a frequency modulation (FM) demodulator 204, in addition to a sync signal detection arrangement similar to the detector 100 of FIG. 8. Detector 200 operates similarly to detector 100 to perform a correlation in correlator 112, estimate timing offset in detector/estimator 116, time shift the known sync signal 42 generated by generator 102 and sampler 104 and provide the shifted sync signal 108a to the sync information calculator 120. Detector 200 assumes that the received signal 110 is frequency modulated. Therefore, modules 112, 116 and 120 may differ slightly from the corresponding modules in detector 100. However, the overall operation of the detectors 100 and 200 to determine timing offset and shift the locally generated sync signal is substantially the same.

In detector 200, the sync information calculator 120 determines whether or not a valid sync signal was received, for example by calculating and comparing a characteristic of the received signal to a certain threshold, and outputs modulation index (g) 206 and frequency offset (dc) 208 as described below.

The modulation index (g) 206 and frequency offset (dc) 208 may be estimated as follows:

$$g = \frac{\sum_i r_i * t_i - \frac{1}{N}\sum_i r_i \sum_i t_i}{\sum_i t_i^2 - \frac{1}{N}\left(\sum_i t_i\right)^2}, \quad dc = \frac{1}{N}\left(\sum_i r_i - g\sum_i t_i\right)$$

where i=1,2,... N are indexes of the received signal (r) and the reference sync signal (t) generated by the detector 200.

In a preferred embodiment of the invention, samples of a received signal output by the FM Demodulate block 204 are compared to the shifted sync signal, re-sampled at new_t_offset and adjusted by the modulation index (g) 206 and frequency offset (dc) 208 to calculate the amount of noise E present in the portion of the received signal in which the sync signal was detected:

$$E = \sum_i (r_i - gt_i - dc)^2.$$

E is compared to a threshold T to determine whether or not the received signal samples $r_i$ represent a valid sync signal. This particular example implementation calculates g and dc followed by the calculation of E using previously calculated values (g and dc) involving the received signal samples $r_i$ and sync signal samples $t_i$. Calculation of g and dc may also be optimized by storage and re-use of sums of received signal samples and sync signal samples. For example, sums of $r_i$ and $t_i$ occur in the above equations for both g and dc. Therefore, these sums need only be calculated once, stored to a memory, and used to calculate both g and dc.

The above expressions for E, g and dc are provided for illustrative purposes only. The invention is in no way restricted thereto. Other sync information and signal characteristics may be calculated and used either by further receiver components or to determine whether or not a detected sync signal is valid.

The method of generating the sync signal (t) sampled at new_t_offset makes the above calculation algorithm for modulation index and frequency offset insensitive to received signal sampling phase and thus eliminates the requirement to resample and re-demodulate received signal samples. It also allows for a fixed threshold T to be established for determination of the validity of a detected sync signal that directly relates to the probability of a missed sync signal detection event which was not possible according to prior art sync signal detection techniques.

In prior art sync signal detection systems, calculation of these or any other parameters derived from the correlation waveform 64 is not feasible. As described above, prior art receivers typically replay and resample the received signal 110 instead of the sync signal 42 with which the received signal 110 is correlated. Thus, the samples in a locally generated reference sync signal indicate the amplitude and position of the sync signal samples in the received signal, which provides for more accurate estimation of modulation index and frequency offset estimation.

The signals output from detector 200 are preferably input to other receiver components. For example, modulation index 206 might be input to a receiver gain control stage. Frequency offset 208 may be connected to a frequency control arrangement, a filter, a frequency converter or other receiver components that perform frequency related or frequency dependent functions. Modulation index 206 and frequency offset 208 are but two parameters that may possibly be calculated from the correlation waveform 64 and received signal 110. Other sync parameters and information could also or instead be calculated, depending upon the particular receiver in which the present invention is implemented.

Figure 11:
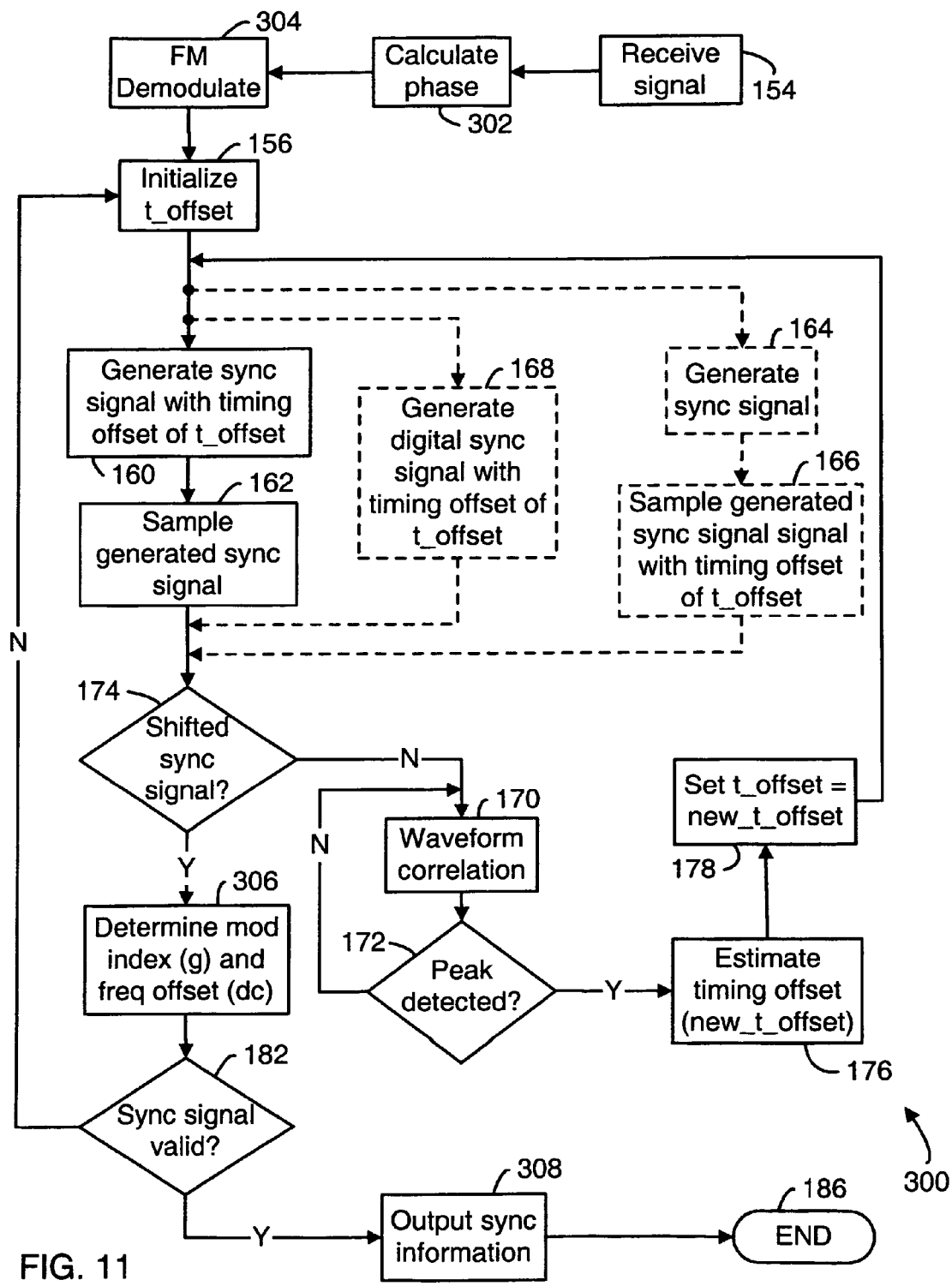
FIG. 11 is a logical flow diagram of the process of the sync signal detector of FIG. 10.

Referring now to FIG. 11, a logical flow diagram of the process of the sync signal detector of FIG. 10 is shown generally as 300. Since the second embodiment is substantially similar to the first embodiment, most of the process steps shown in FIG. 11 are the same as those shown in FIG. 9. As mentioned above however, the second embodiment assumes that the received signal 110 is frequency modulated. Phase calculation step 302 and FM demodulation step 304, are therefore shown in FIG. 11. The sync signal generation steps (160, 162, 164, 166, 168), waveform correlation step 170 and peak detection step 172 may also differ from corresponding steps in FIG. 9 but, as discussed above, would perform similar functions. The operations performed by sync information calculator module 120 in FIG. 10 are shown in FIG. 11 as steps 306 and 308. The steps in the second embodiment are otherwise the same as described above in relation to the first embodiment.

Having described illustrative embodiments of the invention, some examples of contemplated implementations will now be described. Sync signal detectors and methods according to the invention may for example be implemented in receivers having a general structure as shown in FIG. 2. Implementation of the present invention in similar receivers as those having a general architecture as in FIG. 12 is also contemplated.

Figure 12:
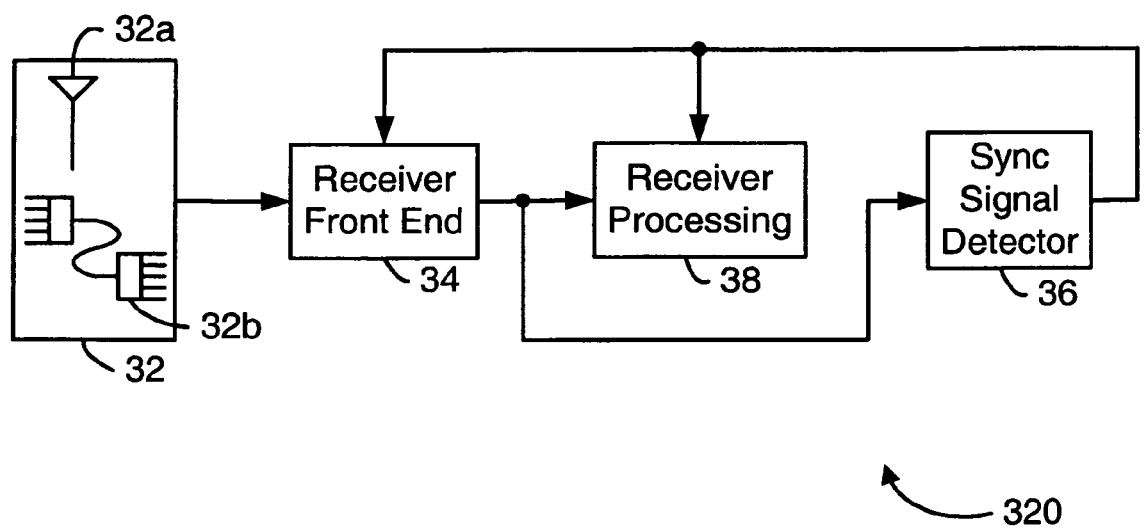
FIG. 12 is a block diagram of a second communication signal receiver.

FIG. 12 is a block diagram of a second communication signal receiver shown generally as 320. FIG. 12 is similar to FIG. 2, but illustrates an alternate arrangement of the receiver front end 34, sync signal detector 36 and receiver processing module 38. In receiver 320 a signal receiving element 32, either an antenna 32a for wireless communication systems or a wired connection 32b for wired communication systems, inputs a received signal to receiver front end module 34. As discussed above in reference to FIG. 2, receiver front end module 34 may perform such functions as amplification, filtering and analog to digital conversion. Receiver front end module 34 then provides an input signal to processing module 38. Sync signal detector 36 operates in accordance with the invention to detect sync patterns in the received signal and apply a time shifting function to a locally generated sync signal. Receiver 320 differs from receiver 30 in that sync signal detector 36 is not connected in the signal path between the front end 34 and processing module 38. Receiver processing module 38, may include symbol detection, deinterleaving, decoding, error detection, error correction and other such signal processing functions. In preferred embodiments of the invention, at least the sync signal detector 36 is implemented with digital components or in a DSP.

Figure 13:
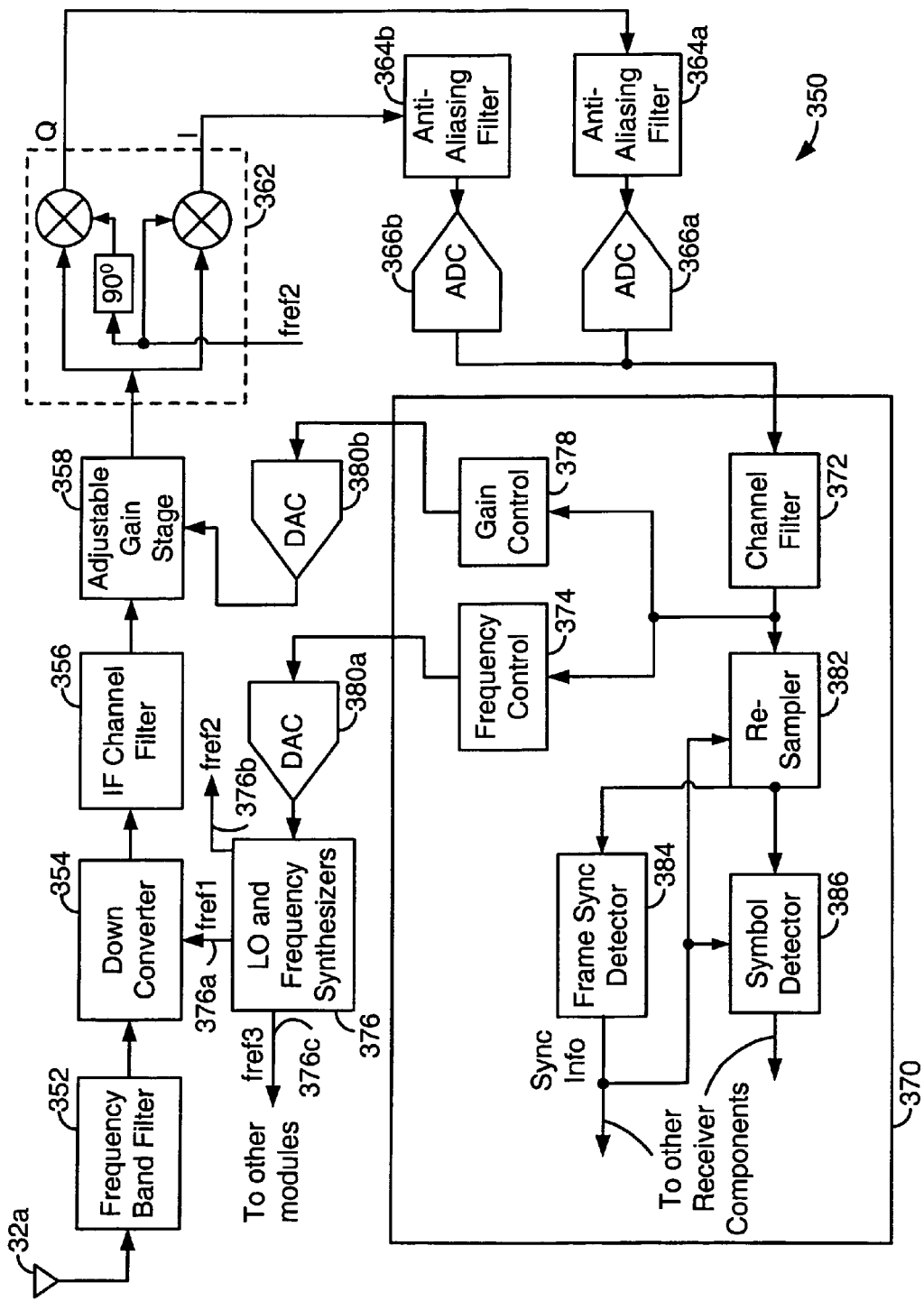
FIG. 13 is a block diagram of a receiver incorporating a sync signal detector according to the present invention.

FIG. 13 is a detailed block diagram of a receiver in which the invention may be implemented. The receiver 350 includes an antenna 32a, the output of which is filtered in a frequency band filter 352. Down converter stage 354 converts the filtered signal from the filter 352 from a higher frequency to a lower frequency, typically from radio frequency (RF) to intermediate frequency (IF). IF channel filter 356 is a band pass filter that filters the down converted signal to select a particular IF channel in the down converted signal. Receiver 350 also includes an adjustable gain stage 358, which as known in the art can be controlled by a gain control signal generated by other receiver components described below.

A quadrature mixer 362 separates the in-phase (I) and quadrature (Q) components of the received signal. Low pass filters 364a and 364b filter out image signal components from the output of mixer 362 and limit the input bandwidth sampled by the ADCs 366a and 366b. The ADCs 366a and 366b provide for signal processing functions in the digital domain, which is preferred for the instant invention.

Digital outputs from the ADCs 366a and 366b are input to a digital signal processor (DSP) 370. In the receiver 350, the I and Q components from ADCs 366a and 366b are input to channel filter 372 in DSP 370. The output from filter 372 is input to a frequency control unit 374, which generates a frequency control signal which in turn controls the local oscillator (LO) and frequency synthesizers generally designated 376 in FIG. 14 and a gain control unit 378, which generates a gain control signal for gain stage 358. DSP 370 is a digital component, whereas gain stages and frequency synthesizers normally use analog control signals. Digital to analog converters (DACs) 380a and 380b may therefore also be provided in the receiver 350. As shown, the LO and frequency synthesizers module 376 provides frequency reference signals fref1, fref2 and fref3 on its outputs 376a, 376b, and 376c. In the example receiver 350, these reference signals are provided to the down converter 354, quadrature mixer 362 and other receiver modules.

The output signal from channel filter 372 is also input to a re-sampler 382, which essentially realigns sample timings in accordance with synchronization information provided by frame sync detector 384. It should be noted that this re-sampling is performed by the re-sampler 382 is based on the accurate timing offset estimate and possibly further sync info from the frame sync detector 384, not as part of the sync signal detection as in known receivers. Frame sync detector 384 operates in accordance with the frame sync detection techniques described above to detect frame sync patterns in received signals. As discussed above, frame sync detector 384 may detect bit sync information as well, it is not restricted to simply recognizing a "frame sync" per se, but for simplicity we refer to it as a frame sync detector.

Frame sync detector 384 detects a unique pattern or signal that is periodically inserted in a transmitted signal to maintain synchronization between a transmitter and receiver. In the Mobitex wireless communication system for example, the maximum length of a transmitted frame is about 1 second, so a Mobitex receiver should receive a frame sync pattern at least once every second. Frame sync detector 384 outputs synchronization information that may be used by other receiver components such as the symbol detector 386, the operation of which will be apparent to those skilled in the art, to maintain synchronization. As described above, a frame sync detector 384 in accordance with the present invention provides for implementation of symbol detector 386 as a soft decision symbol detector. Other receiver components that receive sync info from the detector 384 and/or received signal information from the symbol detector 386 may include further DSP components, and/or components that are not implemented as part of the DSP 370. Although these other receiver components will differ for different receivers, many receivers include components to perform one or more of the operations of descrambling, deinterleaving, decoding, decryption, error checking and error correction. In addition, a microprocessor or software application in a communication device in which the receiver 120 is implemented may process data in a received signal. If detector 384 is implemented as shown in FIG. 10, the phase calculator 202 could be a rectangular to polar coordinate converter. Such a converter would convert the rectangular I and Q (I+jQ) signal components input to detector 384 from the re-sampler 382 into polar amplitude and phase components (A∠φ), of which the phase φ would be input to the FM demodulator 204. Frame sync detector 384 would then operate as discussed above to generate frequency offset and modulation index estimates, which may be fed back to frequency control unit 374, gain control unit 378 or other receiver components.

Further synchronization and control parameters may also be calculated in frame sync detector 384 for input to frequency control unit 374, gain control unit 378, re-sampler 382, symbol detector 386, and any other receiver components as shown in the FIG. 13. For example, for M-ary symbols, comprising M values per symbol, non-linearity of a communication channel could be computed by the frame sync detector 384 and provided to other receiver components.

Receiver 350 represents an illustrative embodiment of the present invention. Practical implementation of the invention is not intended by the inventors to be restricted to the example of receiver 350. The present invention is applicable to both wired and wireless receivers, which may or may not include all of the functional blocks shown in FIG. 13. Similarly, receivers or communication devices in which the invention is implemented may also include further functions and components in addition to those disclosed above. In many contemplated embodiments, a receiver embodying sync pattern detection in accordance with the invention would be a part of a two-way communication device, which would also include a transmitter.

Although described primarily in the context of a particular receiver architecture, the invention may be applied to virtually any wireless communications device in which sync pattern detection is required. Wireless modems such as those disclosed in U.S. Pat. No. 5,619,531, titled "Wireless Radio Modem with Minimal Interdevice RF Interference", issued on Apr. 8, 1997, and U.S. Pat. No. 5,764,693, titled "Wireless Radio Modem with Minimal Inter-Device RF Interference", issued on Jun. 9, 1998, both assigned to the assignee of the instant invention, represent types of communication devices in which the invention may be implemented. The disclosures of these patents are incorporated herein by reference. Many conventional wired modems also require sync pattern detection and therefore would be suitable for application of the invention.

In further preferred embodiments, the invention may be configured to operate in conjunction with mobile communication devices, such as those disclosed in co-pending U.S. Pat. No. 6,278,442, issued on Aug. 21, 2001, and entitled "Hand-Held Electronic Device With a Keyboard Optimized for Use With the Thumbs", the disclosure of which is incorporated into this description by reference. Other systems and devices in which the invention may be implemented include, but are not limited to, further fixed or mobile communication systems, hand-held communication devices, personal digital assistants (PDAs) with communication functions, cellular telephones, one-way pagers and two-way pagers.

It will be appreciated that the above description relates to preferred embodiments by way of example only. Many other variations of the invention will be obvious to those knowledgeable in the field, and such obvious variations are within the scope of the invention as described and claimed, whether or not expressly described. For example, the invention need not necessarily be part of a DSP and implemented primarily in software as in the above preferred embodiments. The sync signal detection techniques according to the invention may also be at least partially implemented in hardware. Further as one skilled in the art will recognize our use of the term "frame sync" applies to only one type of synchronization signal. The present invention may be used to detect any synchronization pattern.

We claim:

1. A synchronization (sync) signal detector comprising:
a sync signal generator for generating a reference sync signal, the reference sync signal having a signal characteristic that matches a known sync pattern in a received input signal;
a sampler coupled to the sync signal generator that samples the reference sync signal to generate a digitized reference sync signal;
a waveform correlator coupled to the sampler, the waveform correlator receiving a sampled portion of the received input signal and comparing the sampled portion of the received input signal to the digitized reference sync signal to generate a correlation waveform;
a peak detector coupled to the waveform correlator and that detects a peak in the correlation waveform to estimate a timing offset, the peak in the correlation waveform indicating a potential alignment between the digitized reference sync signal and the known sync pattern in the sampled portion of the input signal;
the digitized reference sync signal being offset by the timing offset to generate a time-shifted digitized reference sync signal; and
a synchronization information calculator that receives the time-shifted digitized reference sync signal and the sampled portion of the received input signal and that compares the time-shifted digitized reference sync signal with the sampled portion of the received input signal to determine if the sampled portion of the received input signal includes a valid sync signal, the synchronization information calculator providing data to one or more components external to the synchronization signal detector, the data provided by the synchronization information calculator including information indicating whether or not the input signal includes the valid sync signal, wherein the data provided by the synchronization calculator includes a modulation index and determining if the sampled portion of the received input signal includes a valid sync signal further comprises calculating an amount of noise present in the sampled portion of the received input signal using the modulation index and comparing the amount of noise with a threshold to determine whether or not the sampled portion of the received input signal includes the valid sync signal.

2. The sync signal detector of claim 1, implemented in a communication signal receiver.

3. The sync signal detector of claim 1, wherein the data provided by the synchronization information calculator further includes a frequency offset.

4. The sync signal detector of claim 1, wherein the waveform correlator and the peak detector are implemented in a digital signal processor (DSP).

5. The sync signal detector of claim 1, implemented in a communication device selected from the group consisting of wired and wireless modems, hand-held communication devices, personal digital assistants (PDAs) with communication functions, cellular telephones, one-way pagers and two-way pagers.

6. A wireless communication device, comprising:
a receiver that receives a communication signal, the communication signal including a sync pattern for use in decoding the communication signal;
a sync signal generation circuit that generates a digital reference sync signal, the digital reference sync signal having a signal characteristic that matches a known signal characteristic of the sync pattern in the communication signal;
a waveform correlator that compares a sampled portion of the communication signal with the digital reference sync signal to generate a correlation waveform;
a peak detector that detects a peak in the correlation waveform to identify a potential alignment between the digital reference sync signal and the sync pattern in the sampled portion of the communication signal;
a timing offset estimator configured to estimate a timing offset in the correlation waveform peak, the timing offset being fed back to the sync signal generation circuit;
the sync signal generation circuit being configured to offset the digital reference sync signal using the timing offset; and a synchronization information calculator that compares the offset digital reference sync signal with the sampled portion of the communication signal to determine whether the sampled portion of the communication signal includes a valid sync signal, wherein the data provided by the synchronization information calculator includes a modulation index and determining whether the sampled portion of the communication signal includes a valid sync signal further comprises calculating an amount of noise present in the sampled portion of the communication signal using the modulation index and comparing the amount of noise with a threshold to determine whether the sampled portion of the communication signal includes a valid sync signal.

7. The wireless communication device of claim 6, wherein the synchronization information calculator uses the offset digital reference sync signal and the communication signal to determine a frequency offset.

8. The wireless communication device of claim 6, wherein the waveform correlator and the peak detector are implemented by a digital signal processor (DSP).

9. The wireless communication device of claim 6, wherein the sync signal generation circuit includes:
a sync signal generator that generates a reference sync signal; and
a sampler that samples the reference sync signal to generate the digital reference sync signal.

10. The wireless communication device of claim 9, wherein the offset digital reference sync signal is generated by time-shifted the reference sync signal.

11. The wireless communication device of claim 9, wherein the offset digital reference sync signal is generated by time-shifted the digital reference sync signal.

12. The wireless communication device of claim 6, wherein the signal characteristic is a signal shape.

13. The wireless communication device of claim 6, wherein the signal characteristic is a data pattern.

14. The wireless communication device of claim 6, wherein the timing offset is estimated using a curve fitting technique.

* * * * *

UNITED STATES PATENT AND TRADEMARK OFFICE
CERTIFICATE OF CORRECTION

PATENT NO. : 7,426,234 B2  Page 1 of 1
APPLICATION NO. : 11/499292
DATED : September 16, 2008
INVENTOR(S) : Simmons et al.

It is certified that error appears in the above-identified patent and that said Letters Patent is hereby corrected as shown below:

Column 16, line 9, please replace "time-shifted" with -- time-shifting --
Column 16, line 12, please replace "time-shifted" with -- time-shifting --

Signed and Sealed this

Fifteenth Day of June, 2010

David J. Kappos
*Director of the United States Patent and Trademark Office*